W. McDOUGALL.
REEL HOLDER.
APPLICATION FILED SEPT. 21, 1907.
955,980.  Patented Apr. 26, 1910.
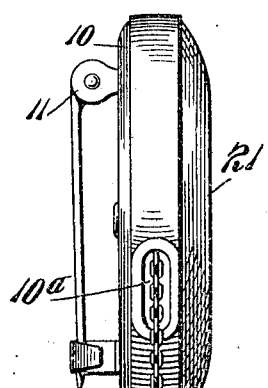
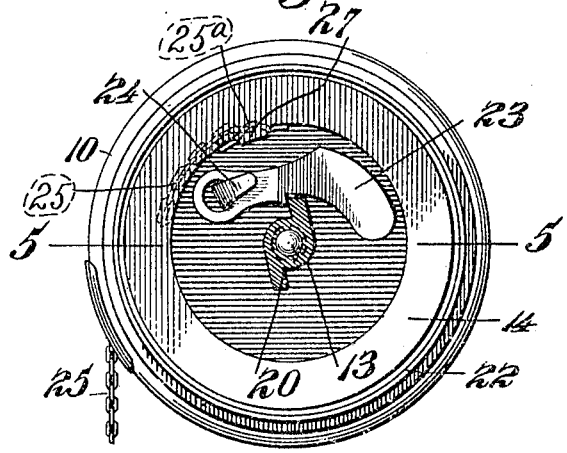
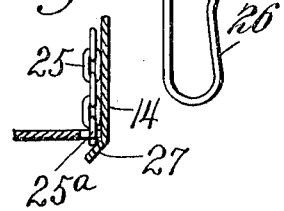
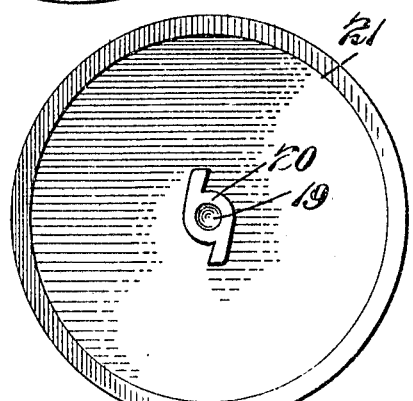
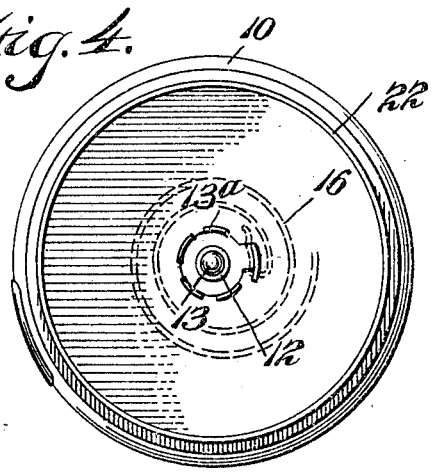
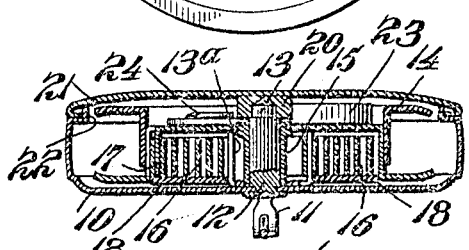
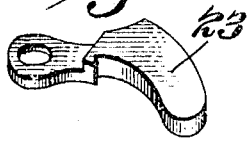

UNITED STATES PATENT OFFICE.

WALTER McDOUGALL, OF NEW YORK, N. Y.

REEL-HOLDER.

955,980.  Specification of Letters Patent.  Patented Apr. 26, 1910.

Application filed September 21, 1907. Serial No. 393,996.

*To all whom it may concern:*

Be it known that I, WALTER MCDOUGALL, a citizen of the United States of America, and a resident of the borough of Brooklyn, in the city of New York and State of New York, have invented certain new and useful Improvements in Reel-Holders, of which the following is a specification.

My invention relates to reel holders and is especially concerned with certain improvements upon the class of reel-holders shown in my United States Patent No. 721460 granted February 24th, 1903. In my said prior patent a reel-holder is described which comprises a case, a clasp pin fixed on the back plate of the case whereby the holder may be attached to the clothing, a reel inclosed in the case, a helical spring located within the reel and having one of its ends secured to the case and its other end secured to the reel whereby the reel is rotated within the case, a chain attached at its inner end to the reel and adapted to be wound around the reel when the latter is rotated by the spring, a hook secured to the outer end of the chain whereby an article, for example, a pair of eye-glasses is held, a pawl check, and a check pawl adapted to engage the pawl check and thrown by centrifugal force out of such engagement whereby the chain may be readily drawn out to its full length and the reel locked against movement until by a slight twitch or jerk the reel is released and the chain is automatically rewound around the reel by the spring.

My improvements comprise an improved case, an improved cover for the spring chamber, an improved pawl check, and an improved supporting post for the reel, all of which with other minor improvements will appear hereinafter.

In the accompanying drawings, I have illustrated so much of the reel holder set forth in my said prior Patent No. 721460 as will enable me to show the improvements which my invention comprises.

In said drawings: Figure 1 is a side elevation of the complete reel-holder, Fig. 2 is a front elevation of the flanged back plate of the case with the reel in position within the same and showing also the pawl check, Fig. 3 is a view in elevation showing the inside of the cover plate and the pawl check thereon, Fig. 4 is a front elevation of the flanged back plate of the case, the reel being removed, showing the basket on the flanged back plate, and one end of the reel operating spring which is secured to the back plate of the case by the basket, Fig. 5 is a transverse section of the device on line 5—5 of Fig. 2, showing the position of the various parts, and Fig. 6 is a detail perspective view of the check pawl, Fig. 7 is a detail sectional view showing the securing of the chain to the reel.

Referring now more specifically to the drawings, 10 indicates the flanged back plate of the case having secured to its back in any suitable manner, the clasp pin device 11. The flange of back plate 10 projects forward, thus giving to the back plate the form of a cup, and a perforation $10^a$ is formed in the flange, having its walls wholly within the flange. A central supporting post 12 has one of its ends reduced and passed through a perforation in the back plate upon which the end is upset, and its other or forward end 13 reduced and tapered, as clearly shown in Fig. 5, for a purpose to be described later. Surrounding the supporting post 12 is a basket $13^a$ having a flat base suitably secured to the back plate 10, and forwardly projecting fingers, one of which, as shown in Fig. 4, is hook shaped and extends farther out than the others in order to catch and hold a looped end of the reel operating spring to be hereinafter described. The supporting post 12 serves as an axle for journaling the reel 14, which may be of any suitable construction, mainly similar to that shown in my above mentioned prior United States patent, but having its front and back flanges curved as shown in Fig. 5 to conform with the case. This reel has a central collar or sleeve 15 which surrounds the supporting post 12 and by which rotation of the reel 14 upon the supporting post 12 is permitted. To cause such rotation, a spring 16 is suitably positioned in a spring chamber formed in the back of reel 14 and has its inner end looped as shown in Fig. 4 so as to be engaged by the prolonged hooking finger above referred to of the basket $13^a$, thus fixing this end of the spring to the back plate of the case. The outer end of the spring 16 is secured to the reel 14 by any suitable means, but preferably by a lip 17 stamped out from the side of the reel as shown in Fig. 5 which engages a loop in the outer end of the spring. In order to confine the spring 16 within the spring chamber of reel 14, and to protect it from any uneven parts which might be present on the back plate of some form of case different from that illustrated, an annular confining disk or ring 18 is formed of a proper size to close the chamber of the reel and be substantially flush with the back of the reel, as clearly shown in Fig. 5.

As above stated, the supporting post 12 has a reduced and tapered end 13. This form is given the forward end of the post 12 in order to permit it to find a seat in recess 19 of the pawl check 20 secured to the inner side of the cover plate 21 as shown in Figs. 3 and 5. The pawl check 20 thus forms an abutment for the end of the supporting post 12 and by its abutment with the latter prevents the front and back of the case from being pressed in against the operating parts. The cover plate 21 is formed so as to be pressed upon the spring seat 22 on the forward rim of the flange of back plate 10, in the well known manner. The check pawl is shown at 23 and is loosely pivoted on the front of the reel 14 by lip 24, as clearly shown in Fig. 2. The engaging surface of pawl check 20 is not directly radial to the recess 19, but is rather tangential thereto, (that is, the pawl is undercut), the recess in check pawl 23 being correspondingly formed so as to insure an effective locking of the reel. This engagement takes place when the rotation of the reel stops with the check pawl 23 at the top in the position shown at Fig. 2.

The chain 25 has at its outer end a hook 26 for holding eye glasses or the like and terminates at its inner end in a bowed cotter pin or the like 25ª taking under the edges of the opening formed by striking out a lip 27 which lip holds the bowed pin in place. The lip 24 is formed a short distance below and slightly to the left of the lip 27 in Fig. 2 and the check pawl 23 is cut away on its back to avoid the lip 27 when swinging outward. In my former patent above referred to the chain was attached to the wheel at a different part, but by my new arrangement there is less chain idle when drawn out.

In operation the chain 25 which has at its outer end a hook 26 for engaging the object to be held is wound upon the reel 14. By drawing out the chain 25 the reel 14 is rotated and the spring 16 thus wound, the rotation of the reel being in a direction to release the check pawl 23 from pawl check 20. When the chain 25 has been drawn out to the desired extent it may be held stationary or permitted to retract slowly, a slight distance, until the rotation of the reel 14 under the influence of spring 16 brings the check pawl 23 to the top whereupon the check pawl drops by gravity into engagement with the pawl check 20, thereby locking the reel against rotation and leaving the chain 25 drawn out. To retract the chain, it is drawn out a sufficient distance to disengage the pawl check from the check pawl and permitted to run back under the influence of the spring, with sufficient speed to keep the check pawl by centrifugal force free from the pawl check.

I claim:

1. In a reel holder, the combination with a back plate, a supporting post secured at one end thereto, a reel journaled on said supporting post, and a spring adapted to rotate said reel upon said supporting post; of a cover plate, a pawl check thereon having a seat adapted to receive the other end of said supporting post, and a check pawl on said reel adapted to engage said pawl check and lock the reel against rotation.

2. In a reel holder, the combination with a back plate, a supporting journal post rigidly secured at one end thereto and having its other end reduced, a reel journaled on said supporting journal post, and a spring adapted to rotate said reel on said supporting post; of a cover plate, a pawl check fixed on the back thereof having a seat adapted to receive the reduced end of said supporting post, and a check pawl on said reel adapted to engage said pawl check and lock said reel against rotation.

3. In a reel holder, the combination with a back plate, a supporting journal post rigidly secured at one end thereto and having its other end reduced and tapered, a reel journaled on said post, and a spring adapted to rotate said reel upon said supporting post; of a cover plate, a pawl check fixed on the back thereof having a seat corresponding in outline with and adapted to receive the reduced and tapered end of said supporting journal post, and a check pawl on said reel adapted to engage said pawl check and lock said reel against rotation.

4. In a reel holder, the combination with a case, and a spring actuated reel therein; of a chain, means for fastening one end of said chain to said reel, a pawl check fixed on said case, and a pivoted check pawl on said reel disposed between said chain fastening means and said pawl check and having its back cut away so as to avoid said chain fastening means while operating.

5. In a reel holder, the combination with the reel having a struck out lip leaving a perforation therein; of a chain, and a fastener secured to the end of the chain, passing through said perforation retained by the walls of said perforation and disposed under said lip.

WALTER McDOUGALL.

Witnesses:
HARRY E. KNIGHT,
P. F. SONNEK.